CLINTON, PRATHER & HUTCHINSON.
Corn and Cane Harvester.
No. 67,955.            Patented Aug. 20, 1867.
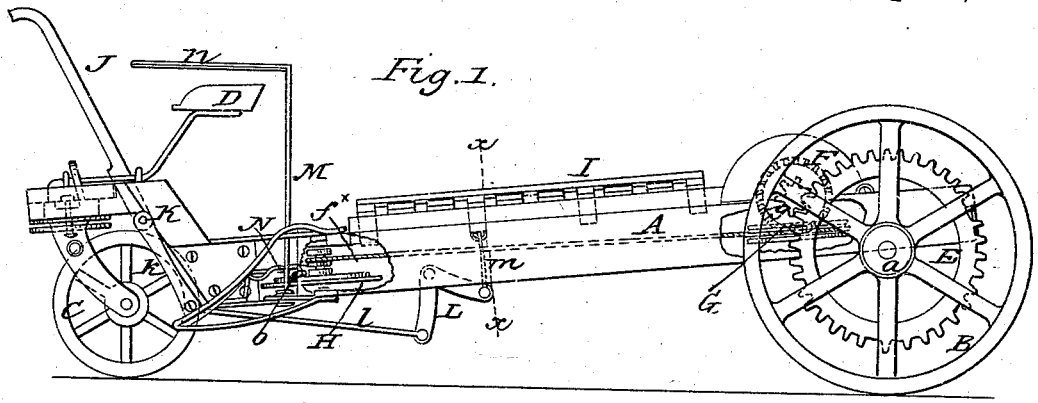
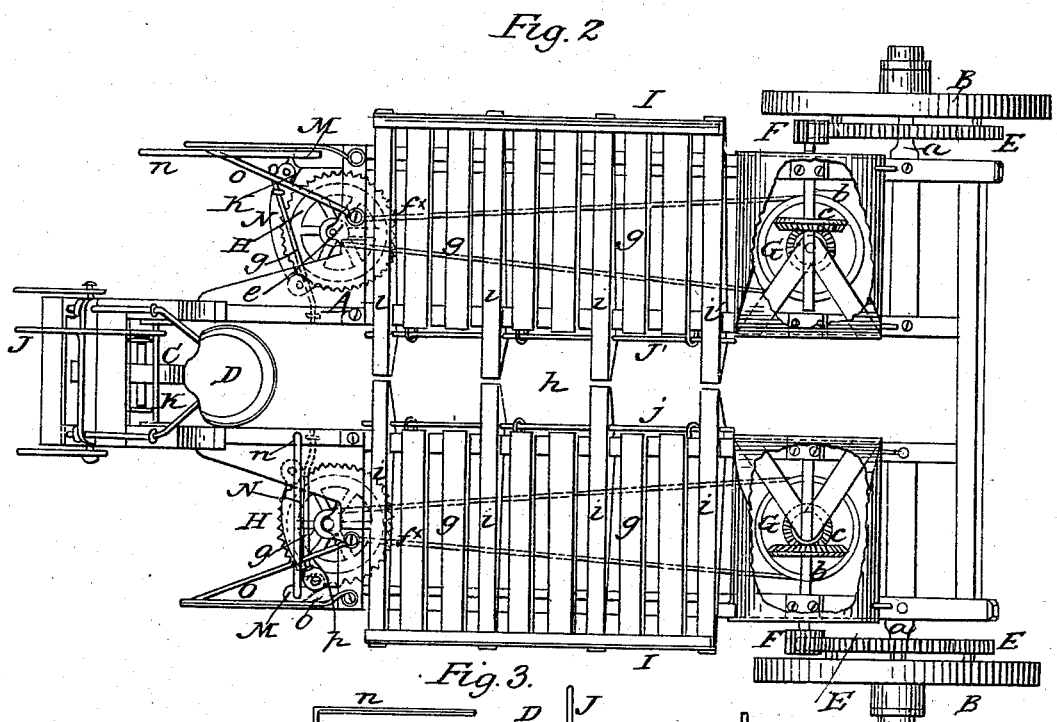
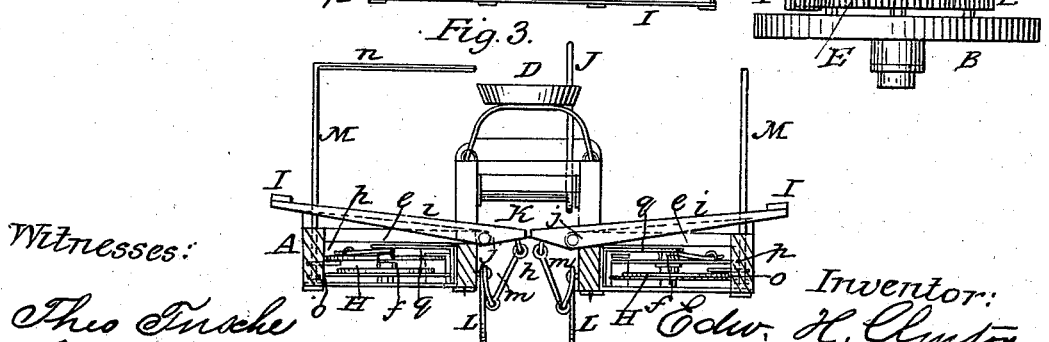
Witnesses:
Theo Tusche
Wm Grewin
Inventor:
Edw. H. Clinton
H Prather
H. O. Hutchinson
by Munn & Co attys.

United States Patent Office.

EDWARD H. CLINTON, WASHINGTON PRATHER, AND HENRY O. HUTCHINSON, OF IOWA CITY, IOWA.

Letters Patent No. 67,955, dated August 20, 1867.

IMPROVEMENT IN CORN AND CANE-HARVESTER.

The Schedule referred to in these Letters Patent and making part of the same.

TO ALL WHOM IT MAY CONCERN:

Be it known that we, EDWARD H. CLINTON, WASHINGTON PRATHER, and HENRY O. HUTCHINSON, of Iowa City, in the county of Johnson, and State of Iowa, have invented a new and improved Corn and Cane-Harvester, and that the following description, taken in connection with the accompanying drawings, hereinafter referred to, forms a full and exact specification of the same, wherein we have set forth the nature and principles of our said improvements, by which our invention may be distinguished from all others of a similar class, together with such parts as we claim and desire to have secured to us by Letters Patent.

This invention relates to a new and improved machine for cutting standing corn and sugar-cane, and depositing it in gavels for shocking or for the convenience of depositing it upon carts or wagons for carrying it out of the field to any place where required. In the accompanying sheet of drawings—

Figure 1 is a side view of our invention.

Figure 2, a plan or top view of the same.

Figure 3, a transverse section of the same, taken in the line $x\ x$, fig. 1.

Similar letters of reference indicate like parts.

A represents the frame of the machine, which is supported at its rear part by two wheels, B B, and at its front part by a caster-wheel, C, the driver's seat D being on the front part of the frame A. The wheels B B rotate on fixed axles $a\ a$, and each wheel has a toothed rim, E, secured to its inner side, said rims gearing into pinions F F on shafts $b\ b$, placed on the rear part of the frame A, and which shafts, by means of bevel-gears $e$, give motion to the pulleys G G on vertical shafts $g^\times$. At the front part of frame A there are two vertical shafts, $c\ c$, one near each side, on each of which there is a pulley, $f$, and a circular saw, H. These saws may be constructed of a single piece of steel, or they may be composed of a series of segments bolted to a wheel on the shafts $c$. Motion, it will be seen, is given these saws as the machine is drawn along by means of belts $f^\times$ from the shafts $b\ b$. On the frame A there is secured a series of fixed transverse slats, $g$, an opening or space, $h$, being allowed between the inner ends of the slats, which opening extends the whole length of the frame A, as shown in fig. 2. Between the fixed slats $g$ spaces are allowed to receive the slats $i$ of the frames I I, which are fitted loosely on rods $j\ j$, secured longitudinally in the frame A, a frame, I, being at each side of the frame A, and, when not actuated by mechanism, hereinafter described, allowed to rest on the frame A by their own gravity. These frames I I may be raised when desired in order to dump their load, by means of a lever, J, which is within convenient reach of the driver on his seat D, said lever having its lower end attached to a shaft, K, on each end of which there is secured a pendent-arm, $k$, the latter being connected by rods $l\ l$ to the front ends of bent levers L L, the rear ends of which are connected by rods $m$ to the inner ends of the frames I I. At each side of the front end of the frame A there is an upright shaft, M, and these shafts have horizontal arms, $n$, projecting from their upper ends. On the lower parts of these shafts there are secured cranks $o\ o$, to which one end of curved arms N is attached by pivots $p$, the opposite ends of said arms being pivoted to the frame A. The arms N project a little in front of the saws H, and they have springs, $q$, attached, which have a tendency to keep them in an outward position. To the front end of the frame A, at each side, there are attached fingers O O, which, as the machine is drawn along, direct the standing corn or cane to the saws H H, and the corn or cane presses inward the arms N, and causes the arms $n\ n$, on the top of the upright shafts M M, to throw the corn or cane backward on the frames I I, the saws H, by their rotation, cutting off the corn or cane. When a sufficient quantity of cut corn or cane is on the frames I I, it is discharged through the opening or space $h$ by throwing forward the lever J, and thereby raising the frames I I.

This machine is extremely simple and efficient, there being no parts liable to get out of repair or become deranged by use.

Having thus described our invention, we claim as new, and desire to secure by Letters Patent—

1. The discharging frames I I, applied to the frame A, and actuated through the medium of the lever J, substantially as described.

2. The combination of the circular saws or cutters H, arms N N, connected with the shafts M, provided with the arms $u$ at their upper ends, and the discharging frames I I, all arranged in connection with the mounted frame A, to operate substantially in the manner as and for the purpose set forth.

EDWARD H. CLINTON,
WASHINGTON PRATHER,
HENRY O. HUTCHINSON.

Witnesses:
F. P. TAYLOR,
V. G. LEE.